(12) United States Patent
Passa et al.

(10) Patent No.: US 12,005,923 B2
(45) Date of Patent: Jun. 11, 2024

(54) BLOCKAGE ROUTING AND MANEUVER ARBITRATION

(71) Applicant: GM Cruise Holdings LLC, San Francisco, CA (US)

(72) Inventors: Nitin Passa, San Francisco, CA (US); Beini Jiang, Santa Clara, CA (US); Tucker Paxton, San Francisco, CA (US); Lucio Otavio Marchioro Rech, San Mateo, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 42 days.

(21) Appl. No.: 17/002,404

(22) Filed: Aug. 25, 2020

(65) Prior Publication Data
US 2022/0063661 A1 Mar. 3, 2022

(51) Int. Cl.
*B60W 60/00* (2020.01)
*G01C 21/34* (2006.01)
*G06V 20/56* (2022.01)
*G06V 20/58* (2022.01)

(52) U.S. Cl.
CPC ..... *B60W 60/0011* (2020.02); *G01C 21/3438* (2013.01); *G01C 21/3461* (2013.01); *G06V 20/58* (2022.01); *G06V 20/588* (2022.01); *B60W 2420/408* (2024.01)

(58) Field of Classification Search
None
See application file for complete search history.

(56) References Cited

U.S. PATENT DOCUMENTS

| 8,121,749 B1 | 2/2012 | Agrawal et al. |
| 2019/0025820 A1* | 1/2019 | Ferguson ............. G08G 1/0112 |
| 2019/0220011 A1* | 7/2019 | Della Penna ........ G05D 1/0212 |
| 2019/0250626 A1* | 8/2019 | Ghafarianzadeh ....... G06N 7/01 |
| 2019/0384293 A1* | 12/2019 | Yoo ...................... G05D 1/0246 |
| 2021/0271258 A1* | 9/2021 | Tran ..................... G05D 1/0088 |
| 2021/0383096 A1* | 12/2021 | White .................... G06N 20/00 |

FOREIGN PATENT DOCUMENTS

| KR | 20190140355 | * 12/2019 |
| WO | 2017136283 A1 | 8/2017 |

OTHER PUBLICATIONS

International Search Report and Written Opinion for Application No. PCT/US2021/042313, dated Nov. 18, 2021, 10 Pages.

* cited by examiner

*Primary Examiner* — Hongye Liang

(57) ABSTRACT

The subject disclosure relates to solutions for arbitrating traffic blockages along vehicle routes. In some aspects, the disclosed technology encompasses a method including steps for determining a vehicle route, wherein the vehicle route comprises at least one lane plan to be followed by an autonomous vehicle (AV), identifying a blockage along the vehicle route, analyzing the blockage to determine if the blockage constitutes a persistent blockage, and if the blockage constitutes a persistent blockage, associating a time value with the blockage. Systems and machine-readable media are also provided.

16 Claims, 6 Drawing Sheets

BLOCKAGE ROUTING AND MANEUVER ARBITRATION

BACKGROUND

1. Technical Field

The subject technology provides solutions for improving routing decisions in autonomous vehicles (AVs) and in particular, for intelligently storing and updating persistent blockage information used to inform AV routing and maneuver operations.

2. Introduction

Autonomous vehicles (AVs) are vehicles having computers and control systems that perform driving and navigation tasks that are conventionally performed by a human driver. As AV technologies continue to advance, ride-sharing services will increasingly utilize AVs to improve service efficiency and safety. However, for effective use in ride-sharing deployments, AVs will be required to perform many of the functions that are conventionally performed by human drivers, such as performing navigation and routing tasks necessary to provide a safe and efficient ride service. Such tasks may require the collection and processing of large quantities of data using various sensor types, including but not limited to cameras and/or Light Detection and Ranging (LiDAR) sensors disposed on the AV.

BRIEF DESCRIPTION OF THE DRAWINGS

Certain features of the subject technology are set forth in the appended claims. However, the accompanying drawings, which are included to provide further understanding, illustrate disclosed aspects and together with the description serve to explain the principles of the subject technology. In the drawings:

DETAILED DESCRIPTION

Figure 1:
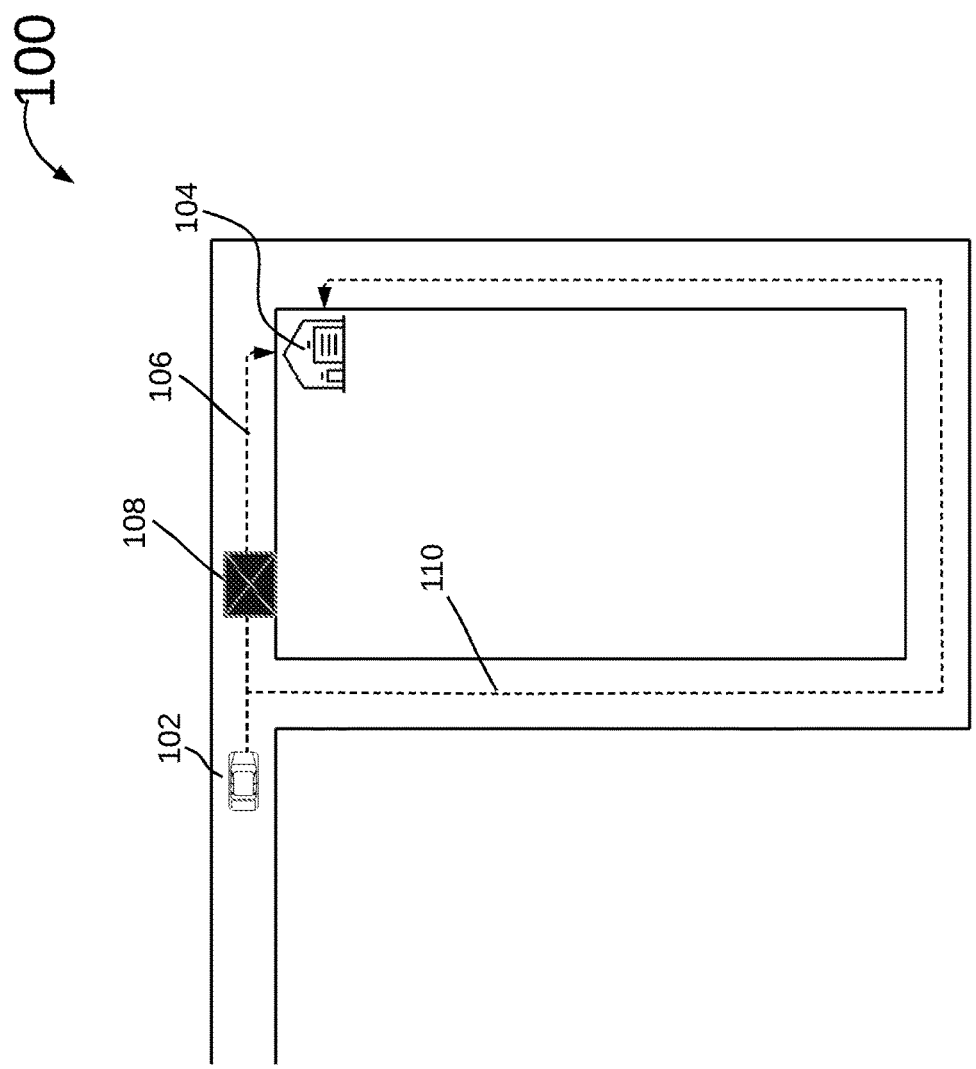
FIG. 1 illustrates an example environment in which a blockage arbitration system of the disclosed technology may be implemented.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Encountering road blockages, such as those caused by double-parked vehicles, presents an obstacle to executing vehicle routing/maneuver operations. For example, road blockages often need to be circumvented by modifying the vehicle route to take an alternate path that avoids the blockage. It would be advantageous to be able to accurately store blockage information so that vehicles traversing the same route could make intelligent routing decisions. However, one problem in simply storing road blockage information is that blockages are frequently removed after a short time-span, reflecting the dynamic nature of typical traffic conditions. Therefore, it would be advantageous to accurately update blockage information, for example, to remove old blockages, for previously detected blockages that no longer exist, or are not likely to have persisted.

Aspects of the disclosed technology provide solutions for improving vehicle routing and maneuver arbitration decisions by providing accurate information on previously encountered road blockages. In some aspects, blockages can be identified and then classified based on a characterization of their persistence. For example, non-permanent blockages, such as the type caused by double parked vehicles, may be stored for a pre-determined time duration, after which, the blockage is likely to have been resolved. Potential road blockages, may also be assessed based on severity, i.e., how much the blockage interferes with the vehicle's navigation of the route. For example, double-parked vehicles that are determined to be closer to a road or lane center, and therefore, more difficult to maneuver around may be categorized as blockages, whereas double parked vehicles closer to an edge of the roadway, and therefore more easily bypassed, may not be identified/tagged as a 'blockage' and therefore not persisted in map memory. As discussed in further detail below, blockage persistence can be based on predetermined time values that are associated with the recorded blockage (e.g., as metadata), or may be based on subsequent encounters with the blockage, for example, that indicate blockage persistence or removal.

FIG. 1 illustrates an example environment 100 in which a blockage arbitration system of the disclosed technology may be implemented. In the simplified example of environment 100, a vehicle 102, e.g., an autonomous vehicle (AV), is shown en route to a destination 104. To reach destination 104, AV 102 can follow an initial vehicle route 106, representing the shortest distance, or fastest route to destination 104. As discussed in further detail below, vehicle route 106 may include a lane plan, indicating one or more lanes to be used by AV 102 along route 106 in order to reach destination 104.

In practice, AV 102 can encounter a blockage (e.g., an obstacle or barrier) 108 along initial route 106 that may make it dangerous or difficult for AV 102 to complete its drive to destination 104 via initial route 106. Blockage 108 may be caused by any of a variety of road obstructions, including but not limited to: one or more double-parked vehicle/s, construction, lane closures, human traffic controllers, and/or road accidents, and the like.

Upon approach, blockage 108 may be detected by AV 102, for example, using one or more environmental sensors, including but not limited to: Light Detection and Ranging (LiDAR) sensors, radar, sonar, and/or cameras, etc. In other aspects, AV 102 may become aware of blockage 108 based on a persistence of the indicated blockage in a map database. As discussed in further detail below, various blockages encountered by one or more AVs (e.g., in an AV fleet), can be indicated in a map database that is accessible by AV 102, as well as any number of AVs, for example, in an AV fleet.

In some aspects, a severity of the detected blockage 108 may be evaluated, for example, to determine if AV 102 can safely maneuver around blockage 108, e.g., by changing a lane plan to change lanes, but while keeping the original route (e.g., route 106). Blockage severity may be based on a variety of factors, including a size of the blockage and/or a distance of the blockage to a lane or road center. For example, blockage 108 may be more likely to be deemed impassible if the blockage is closer to the road (or lane) center, as opposed to being closer to the road shoulder or curb. Other metrics may be used to determine how much the blockage interferes with the vehicle route, without departing from the scope of the disclosed technology.

If it is determined that blockage 108 represents an impediment to route 106, i.e., interacts with the best path for vehicle 102, an indication of blockage 108 may be stored, e.g., to a map database. In some aspects, the encounter of AV 102 with blockage 108 may also be used to confirm/verify the persistence of blockage 108 which may have been previously identified by AV 102, or another fleet vehicle. For example, if blockage 108 is already known to AV 102 due to storage in the map database, then the encounter of AV 102 with blockage 108 may be used to confirm that blockage 108 is persistent. However, if blockage 108 has been removed, the encounter may be used to update the map database accordingly, as discussed in further detail below.

Identification and/or verification of the blockage can be associated with a time value, for example, that can be used to indicate how long the blockage should be stored/persisted in the map database (not shown). As discussed in further detail below, the time value may be a predetermined constant, or may be based on certain characteristics of the blockage. For example, blockages due to double parked vehicles may be persisted for less time than those arising from obstructions due to road construction. Once the blockage 108 has been stored and persisted to the map database, an alternate route may be calculated by the AV 102, e.g., alternate route 110.

Figure 2A:
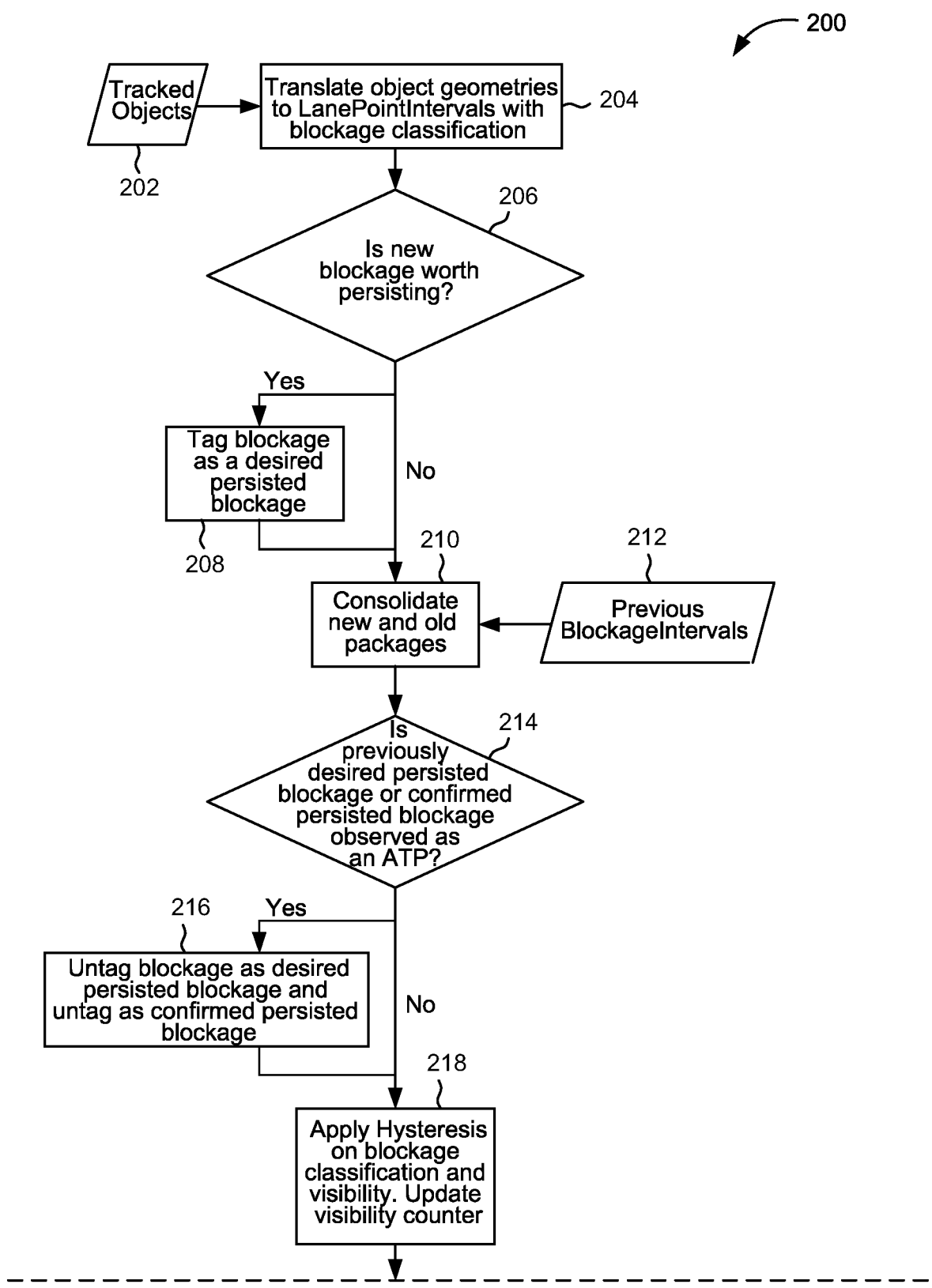
FIGS. 2A and 2B illustrate a logical block diagram of an example process that can be used to perform blockage arbitration, according to some aspects of the disclosed technology.
Figure 2B:
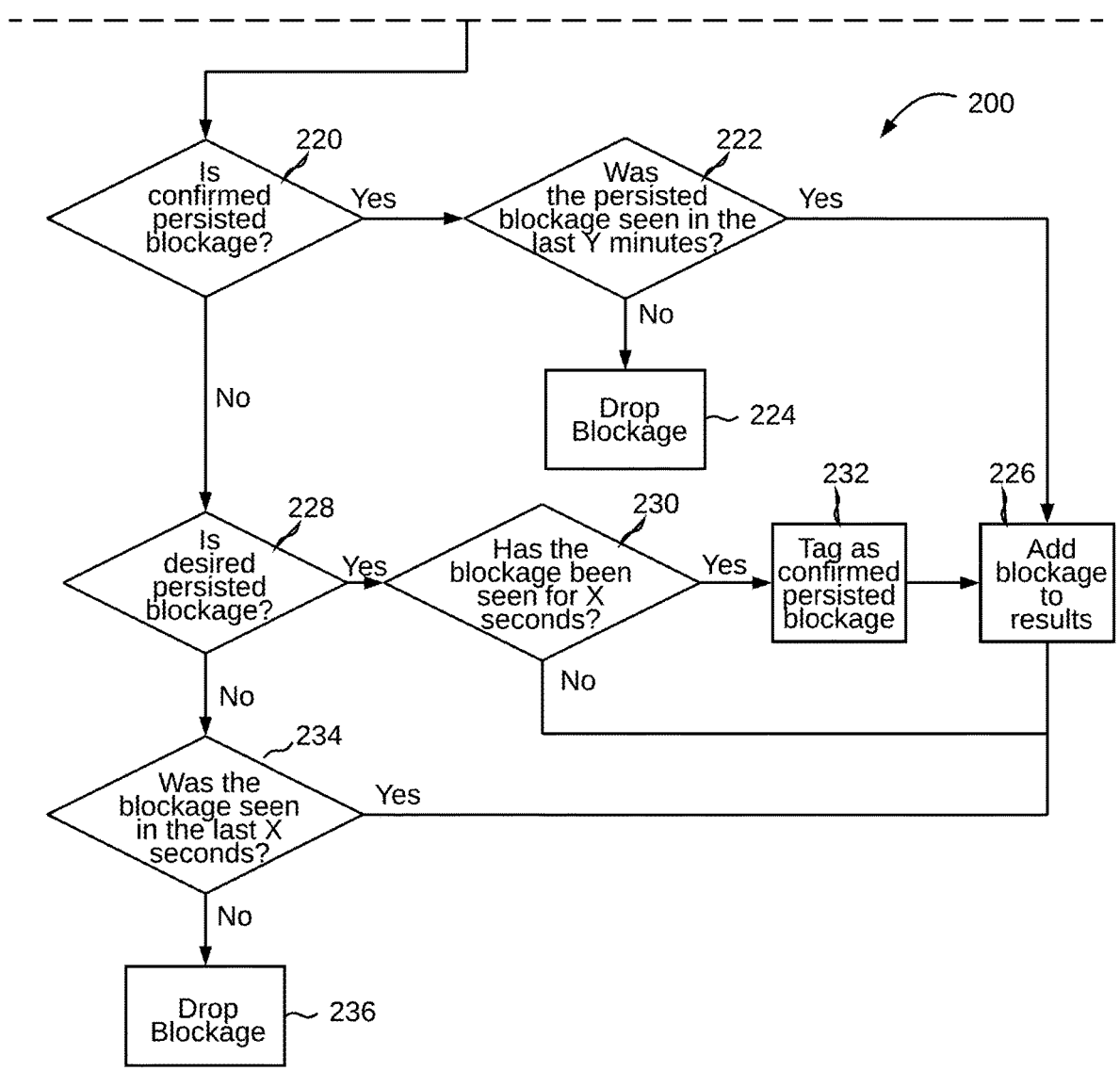

FIGS. 2A and 2B illustrate a logical flow of a process 200 of example steps that can be used to perform a blockage arbitration process, according to some aspects of the technology. Process 200 begins with block 202 in which one or more objects are tracked. Tracked objects can be virtually any objects detected near or around the vehicle, including in the vehicle's route path. By way of example, tracked objects can include non-parked vehicles, parked vehicles (e.g., double-parked vehicles), or any other object/s that reside in, near or around a vicinity of the vehicle, such as construction cones, and are detected by one or more of the vehicle's sensors. As discussed in further detail with respect to FIG. 4, the vehicle's environmental sensors can include Light Detection and Ranging (LiDAR) sensors, cameras, and/or radar sensors, etc., that can be configured to facilitate object detection and tracking, including rendering shapes (e.g., polygons) representing different tracked object types.

In block 204 of process 200 the tracked objects are localized to determine if the objects reside in the AV's route path, for example, in the lane/s to be taken by the AV along its route. Localization of the potential blockage can be performed by translating the tracked object geometries into lane identifiers (e.g., lane-point-intervals) used to identify the lane and location the tracked object.

In block 206, it is determined whether one or more of the tracked objects represent relevant blockages and should be persisted. The relevance of a blockage can be based on an amount of overlap between the AV's route and the blockage location. For example, a tracked object that is not in the AV path (i.e., not obstructing the AV's route plan) may not be relevant, and therefore not worth persisting or reasoning about further. By way of example, a tracked object that is to the side of the road, and not centrally located (e.g., at a lane or road center) may not be deemed to be in the vehicle's path. In such cases, the tracked object/s are not persisted or identified as blockages, and process 200 can proceed to block 210.

Alternatively, if it is determined that the blockage is in the vehicle's route path, then process 200 advances to block 208. In some aspects, a duration of time that the blockage is observed by the AV is used to determine if the blockage should be persisted. For example, blockages not determined to continue beyond a predetermined time threshold (e.g., a half-second) may be disregarded, for example, as potential sensor artifacts or observation errors. Alternatively, tracked objects observed in the vehicle's route path beyond the predetermined time threshold (e.g., a half-second) may be determined to be persistent, and therefore tagged as persistent blockages to be stored for future maneuver and route planning.

In block 210, new and old blockages are consolidated. For example, newly identified blockages (block 208) are consolidated with previously persisted blockages (block 212). Depending on the desired implementation, one or more of the previously persisted blockages may be blockages identified by the AV, or by one or more other AVs, for example, in an AV fleet. It is understood that previously identified blockages may originate from other sources, for example, from third-party data/systems, or from data collected by municipal sensors, etc.

Subsequently, at block 214 it is determined if any of the consolidated blockages (block 210) are observed as an active traffic participant. That is, previously persisted blockages are monitored to determine if they are behaving as traffic participants (e.g., moving roadway vehicles), and thereby should be de-classified (untagged) as persisted blockages. If it is determined that none of the previously persisted blockages are now active traffic participants, then process 200 proceeds to block 218. However, if it is determined that one or more of the previously persisted blockages are now active traffic participants, then process 200 proceeds to block 216, and the persistence of the previously identified blockages is removed. That is, they are untagged as desired persisted blockages, and/or untagged as confirmed persisted blockages.

At block 218, another check is performed to determine if the persisted blockages have been properly tagged. In some implementations, a counter (e.g., a visibility counter) is used to provide a quantitative measure of blockage persistence confidence. In such approaches, the counter can be incremented (or decremented) at discrete observational time periods (ticks). As used herein, a tick can refer to any arbitrarily selected time period, such as 0.1 s, 0.5 s, or 1 s, etc. By way of example, in every time period (tick), in which the blockage is observed (e.g., in which the blockage object is classified as a double parked vehicle), the counter may be incremented, and in every tick where the blockage is not observed (or not given a double parked vehicle classification), the counter may be decremented. As such, blockage persistence may be measured by a number of ticks. In some implementations, a predetermined number of ticks (e.g., eight ticks), can be used to confirm that the blockage is persisted (block 220).

If blockage persistence is not confirmed, process 200 proceeds to step 222 in which it is determined if the blockage was observed within a preceding time period, for example, in the last Y minutes, where Y can be any predetermined time period for which the blockage is to be persisted (e.g., 1 minute, 2 minutes, 5 minutes, etc.). It is understood that blockage observations, in this step, can be observations made from the AV or from any other AV, for example, in an AV fleet, or can be based on data collected for other sources. If no blockage is observed within the predetermined time period, process 200 proceeds to block 224, and the blockage is dropped or removed from consideration. Alternatively, if the blockage is observed within the predetermined time period, then the blockage is added/output to a list or database of persisted blockage results, e.g., a map database (block 226).

If at block 220, the persistence of the of the blockage is not confirmed, then process 200 proceeds to step 228, in which it is determined if the desired persisted blockage has been achieved, i.e., if blockage observations have been allowed to proceed for an adequate number of time periods (ticks). If the desired persisted blockage is achieved, then process 200 proceeds to block 230 and it is determined if the blockage has been seen in a predetermined past time period, e.g., X seconds, where X can be any number of seconds (e.g., 1 second, 2 seconds, 5 seconds, 10 seconds, or 30 seconds, etc.). If the blockage has been observed within the requisite time period of block 230, then the process proceeds to block 232 and the blockage is tagged as being persistent and the process concludes at block 226. Alternatively, if at block 230 it is determined that the blockage has not been observed within the requisite time period, then process 200 proceeds directly to block 226. In some implementation, where the blockage has not been observed within the requisite time period in block 230, then the blockage may be recorded at block 226, but may not be used to perform routing and/or maneuver functions in the future. That is, the blockage may be noted (e.g., in a map database), but not used to make driving path decision for any AV.

If at block 228 it is determined that the desired persisted blockage has not been achieved, i.e., if blockage observations have not continued for an adequate number of time periods (ticks), then process 200 advances to block 234. At block 234, it is determined whether the blockage was seen in the last X seconds, where X can represent any time period, e.g., 2 seconds, 5 seconds, 10 seconds, etc. If the blockage was observed within the specified time period (X) at block 234, then process 200 advances to block 226, and the blockage observation is added to the blockage results list. Alternatively, if the blockage is not observed within the time period (X), then the process 200 advances to block 236, and the blockage is dropped/ignored.

Figure 3:
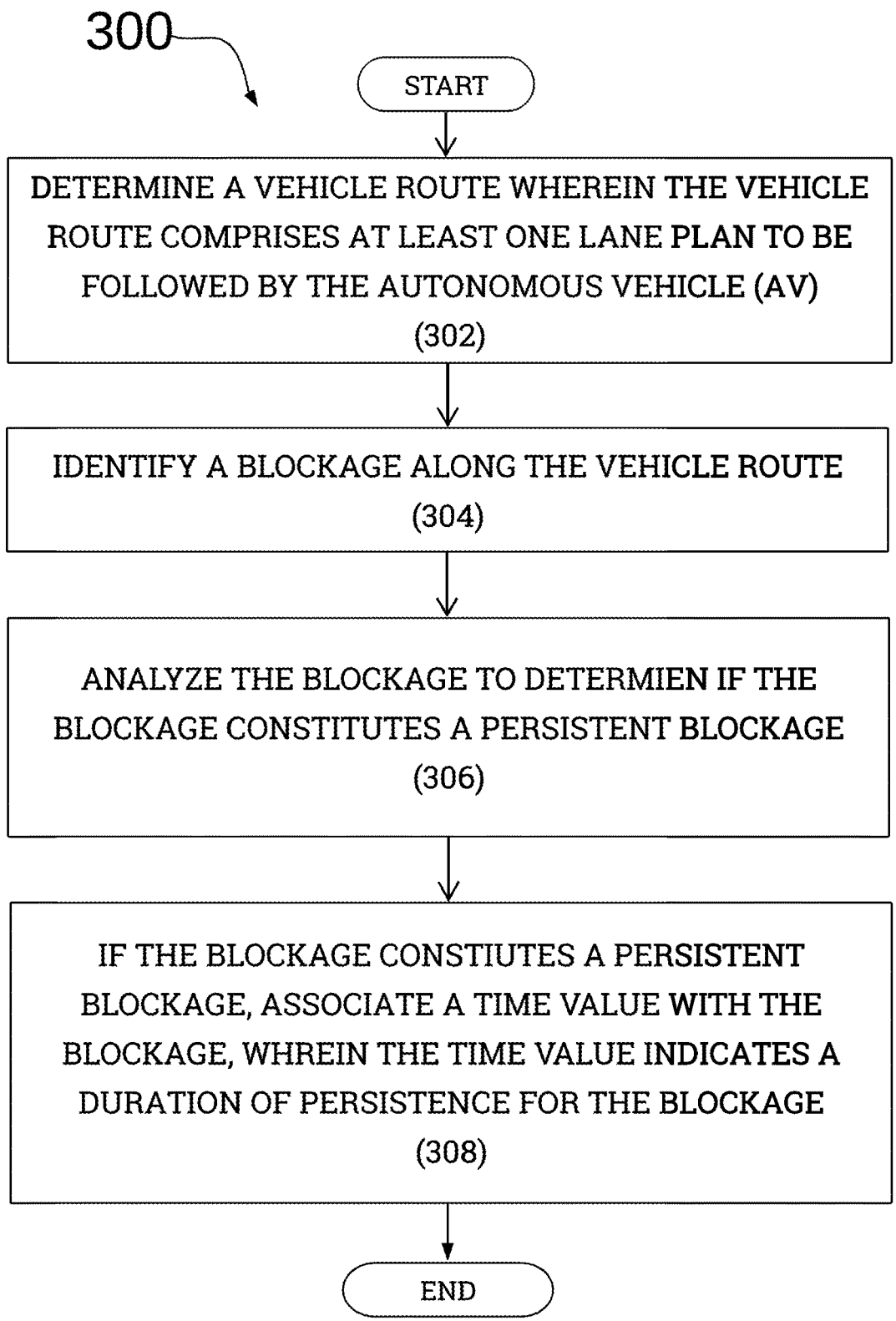
FIG. 3 illustrates an example process for performing blockage arbitration, according to some aspects of the disclosed technology.

FIG. 3 illustrates an example process for performing blockage arbitration, according to some aspects of the disclosed technology. Process 300 begins with step 302 in which a vehicle route is determined (e.g., by an AV), wherein the vehicle route includes at least one lane plan to be followed by the AV. In some aspects, the lane plan can indicate specific lanes to be followed by the AV long the route path. As discussed in further detail with respect to FIG. 4, route planning may be performed wholly on computing systems of the AV, or may be performed remotely, e.g., at one or more remote servers or systems that are responsible for at least a portion of the AV's route planning and/or maneuver operations.

In step 304, a blockage is identified along the vehicle route. As discussed above with respect to FIGS. 2A and 2B, objects tracked by the AV can be evaluated to determine if they present a blockage that would complicate or prevent the AV from executing its original vehicle route (route plan). In some aspects, such determinations can be based on a distance between the observed blockage and a center location of a lane or road specified by the vehicle route. For example, a double parked vehicle that is closer to the lane center may be more likely to be identified as a blockage than a double parked vehicle that is located on the shoulder of a roadway.

In step 306, a persistence of the blockage is determined by further analysis and observation by the AV. As discussed above, observed blockages that persist for predetermined amounts of time (e.g., ticks) can be identified/tagged as being persistent blockages that are worth storing (persisting), e.g., for use in future maneuver and route planning. In some aspects, blockage persistence can be based on a distance between the blockage and a center lane of the vehicle route and/or a distance from at least one lane associated with the lane plan. Additionally, in some aspects, a classification may be associated with the blockage, for example, to identify the tracked objects, or to provide an associated blockage type (e.g., a double parked vehicle or construction obstruction, etc.).

At step 308, a time value is associated with the blockage to indicate how long the blockage should be persisted, e.g., in the map database. The persistence duration for the blockage can be updated based on subsequent observations, either by the same AV, or by other AVs, for example, in an AV fleet. As long as the blockage is persisted, the existence of the blockage can be used to inform maneuvering and/or routing decisions by the AV, or by any other AV that is informed of the blockage. In some aspects, upon encountering and logging a persistent blockage, the AV can automatically determine one or more alternate routes that are available to reach its intended destination.

Figure 4:
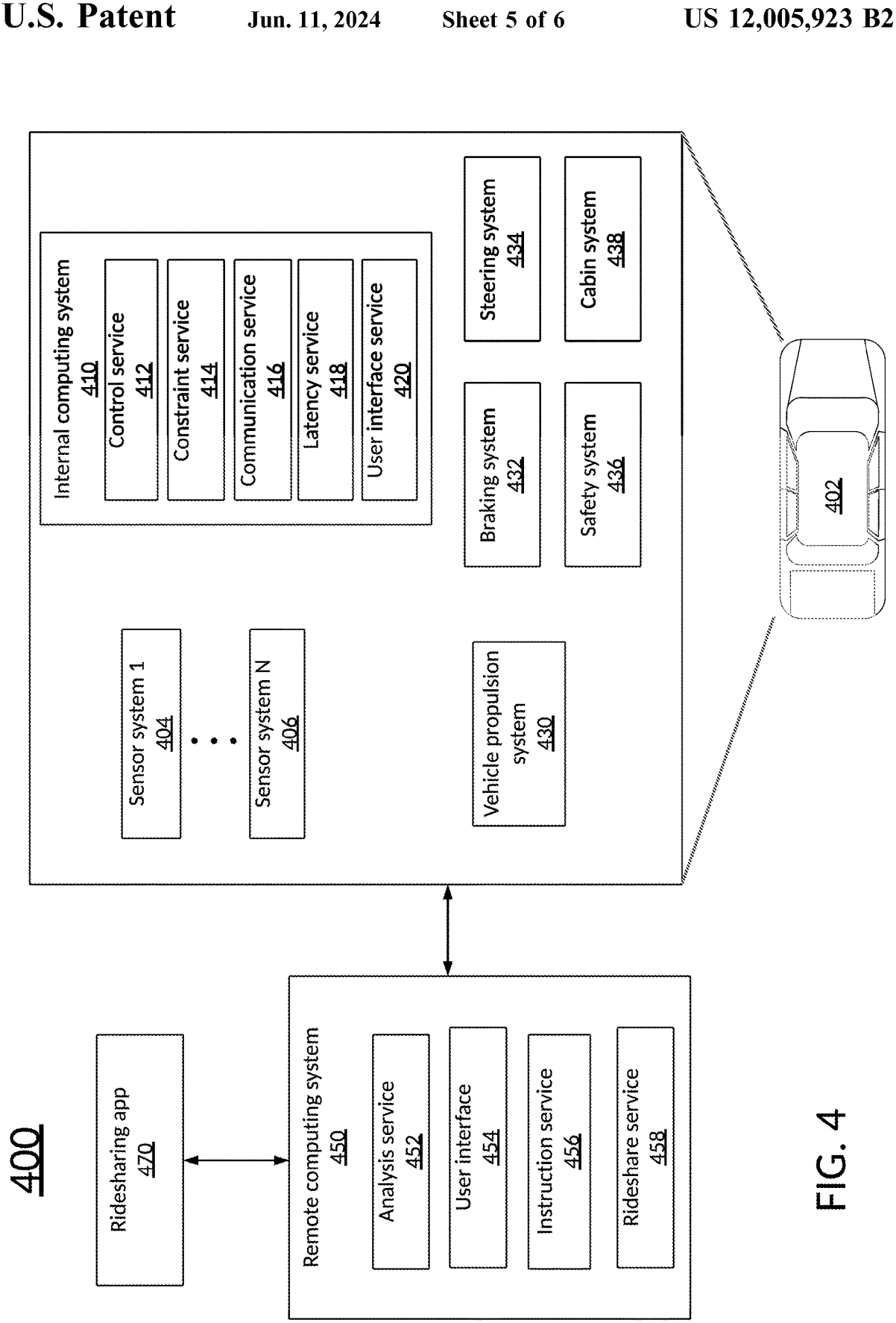
FIG. 4 illustrates an example system environment that can be used to facilitate AV navigation and routing operations, according to some aspects of the disclosed technology.

The disclosure now turns to FIG. 4, which illustrates an example system environment 400 that can be used to facilitate AV dispatch and operations, according to some aspects of the disclosed technology. Autonomous vehicle 402 can navigate about roadways without a human driver based upon sensor signals output by sensor systems 404-406 of autonomous vehicle 402. Autonomous vehicle 402 includes a plurality of sensor systems 404-406 (a first sensor system 404 through an Nth sensor system 406). Sensor systems 404-406 are of different types and are arranged about the autonomous vehicle 402. For example, first sensor system 404 may be a camera sensor system and the Nth sensor system 406 may be a Light Detection and Ranging (LIDAR) sensor system. Other exemplary sensor systems include radio detection and ranging (RADAR) sensor systems, Electromagnetic Detection and Ranging (EmDAR) sensor systems, Sound Navigation and Ranging (SONAR) sensor systems, Sound Detection and Ranging (SODAR) sensor systems, Global Navigation Satellite System (GNSS) receiver systems such as Global Positioning System (GPS) receiver systems, accelerometers, gyroscopes, inertial measurement units (IMU), infrared sensor systems, laser rangefinder systems, ultrasonic sensor systems, infrasonic sensor systems, microphones, or a combination thereof. While four sensors 480 are illustrated coupled to the autonomous vehicle 402, it is understood that more or fewer sensors may be coupled to the autonomous vehicle 402.

Autonomous vehicle 402 further includes several mechanical systems that are used to effectuate appropriate motion of the autonomous vehicle 402. For instance, the mechanical systems can include but are not limited to, vehicle propulsion system 430, braking system 432, and steering system 434. Vehicle propulsion system 430 may include an electric motor, an internal combustion engine, or both. The braking system 432 can include an engine brake, brake pads, actuators, and/or any other suitable componentry that is configured to assist in decelerating autonomous vehicle 402. In some cases, braking system 432 may charge a battery of the vehicle through regenerative braking. Steering system 434 includes suitable componentry that is configured to control the direction of movement of the autonomous vehicle 402 during navigation. Autonomous vehicle 402 further includes a safety system 436 that can include various lights and signal indicators, parking brake, airbags, etc. Autonomous vehicle 402 further includes a cabin system 438 that can include cabin temperature control systems, in-cabin entertainment systems, etc.

Autonomous vehicle 402 additionally comprises an internal computing system 410 that is in communication with sensor systems 480 and systems 430, 432, 434, 436, and 438. Internal computing system 410 includes at least one processor and at least one memory having computer-executable instructions that are executed by the processor. The computer-executable instructions can make up one or more services responsible for controlling autonomous vehicle 402, communicating with remote computing system 450, receiving inputs from passengers or human co-pilots, logging metrics regarding data collected by sensor systems 480 and human co-pilots, etc.

Internal computing system 410 can include a control service 412 that is configured to control operation of vehicle propulsion system 430, braking system 432, steering system 434, safety system 436, and cabin system 438. Control service 412 receives sensor signals from sensor systems 480 as well communicates with other services of internal computing system 410 to effectuate operation of autonomous vehicle 402. In some embodiments, control service 412 may carry out operations in concert one or more other systems of autonomous vehicle 402. Internal computing system 410 can also include constraint service 414 to facilitate safe propulsion of autonomous vehicle 402. Constraint service 414 includes instructions for activating a constraint based on a rule-based restriction upon operation of autonomous vehicle 402. For example, the constraint may be a restriction upon navigation that is activated in accordance with protocols configured to avoid occupying the same space as other objects, abide by traffic laws, circumvent avoidance areas, etc. In some embodiments, the constraint service can be part of control service 412.

The internal computing system 410 can also include communication service 416. The communication service 416 can include both software and hardware elements for transmitting and receiving signals from/to the remote computing system 450. Communication service 416 is configured to transmit information wirelessly over a network, for example, through an antenna array that provides personal cellular (long-term evolution (LTE), 3G, 4G, 5G, etc.) communication.

Internal computing system 410 can also include latency service 418. Latency service 418 can utilize timestamps on communications to and from remote computing system 450 to determine if a communication has been received from the remote computing system 450 in time to be useful. For example, when a service of the internal computing system 410 requests feedback from remote computing system 450 on a time-sensitive process, the latency service 418 can determine if a response was timely received from remote computing system 450 as information can quickly become too stale to be actionable. When the latency service 418 determines that a response has not been received within a threshold, latency service 418 can enable other systems of autonomous vehicle 402 or a passenger to make necessary decisions or to provide the needed feedback.

Internal computing system 410 can also include a user interface service 420 that can communicate with cabin system 438 in order to provide information or receive information to a human co-pilot or human passenger. In some embodiments, a human co-pilot or human passenger may be required to evaluate and override a constraint from constraint service 414, or the human co-pilot or human passenger may wish to provide an instruction to the autonomous vehicle 402 regarding destinations, requested routes, or other requested operations.

As described above, the remote computing system 450 is configured to send/receive a signal from the autonomous vehicle 440 regarding reporting data for training and evaluating machine learning algorithms, requesting assistance from remote computing system 450 or a human operator via the remote computing system 450, software service updates, rideshare pickup and drop off instructions, etc.

Remote computing system 450 includes an analysis service 452 that is configured to receive data from autonomous vehicle 402 and analyze the data to train or evaluate machine learning algorithms for operating the autonomous vehicle 402. The analysis service 452 can also perform analysis pertaining to data associated with one or more errors or constraints reported by autonomous vehicle 402. Remote computing system 450 can also include a user interface service 454 configured to present metrics, video, pictures, sounds reported from the autonomous vehicle 402 to an operator of remote computing system 450. User interface service 454 can further receive input instructions from an operator that can be sent to the autonomous vehicle 402.

Remote computing system 450 can also include an instruction service 456 for sending instructions regarding the operation of the autonomous vehicle 402. For example, in response to an output of the analysis service 452 or user interface service 454, instructions service 456 can prepare instructions to one or more services of the autonomous vehicle 402 or a co-pilot or passenger of the autonomous vehicle 402. Remote computing system 450 can also include rideshare service 458 configured to interact with ridesharing applications 470 operating on (potential) passenger computing devices. The rideshare service 458 can receive requests to be picked up or dropped off from passenger ridesharing app 470 and can dispatch autonomous vehicle 402 for the trip. The rideshare service 458 can also act as an intermediary between the ridesharing app 470 and the autonomous vehicle wherein a passenger might provide instructions to the autonomous vehicle to 402 go around an obstacle, change routes, honk the horn, etc. Remote computing system 450 can, in some cases, include at least one computing system 450 as illustrated in or discussed with respect to FIG. 5, or may include at least a subset of the components illustrated in FIG. 5 or discussed with respect to computing system 450.

FIG. 2A illustrates an example display 200 that can be configured reduce vehicle occupant motion sickness, according to aspects of the disclosed technology. Depending on the desired implementation, display 200 can represent a display that is affixed to an interior surface of a vehicle cabin, such as an in-dash, or in-seat computer display that is provided in the cabin of an autonomous vehicle (AV).

Figure 5:
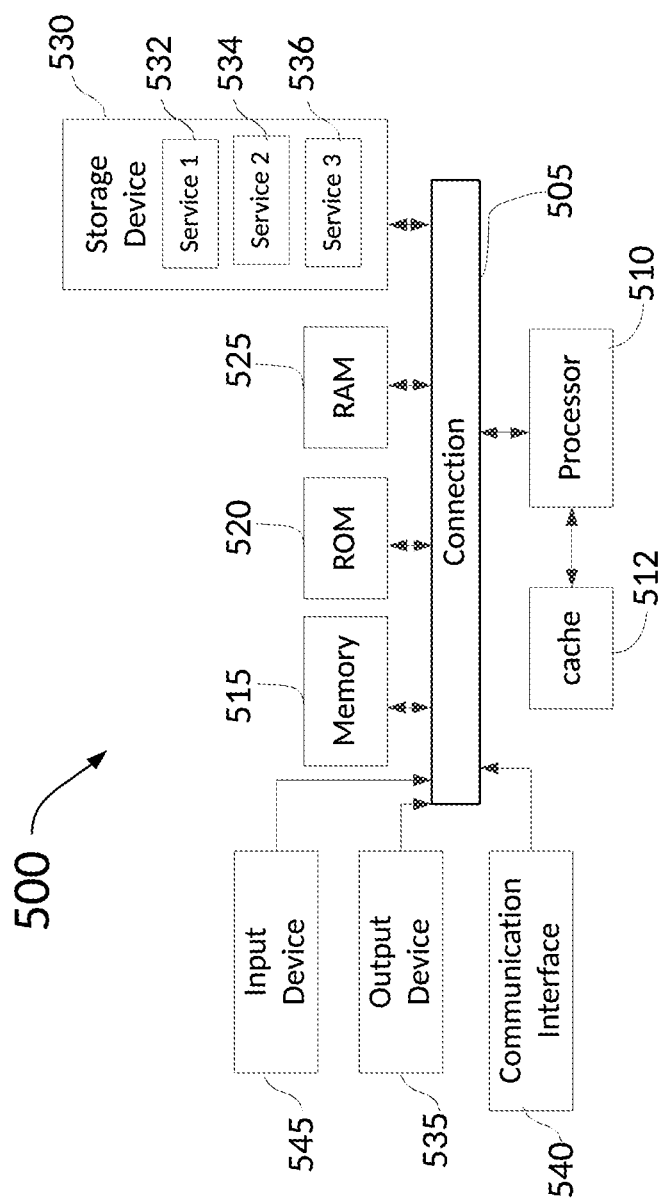
FIG. 5 illustrates an example processor-based system with which some aspects of the subject technology can be implemented.

FIG. 5 illustrates an example processor-based system with which some aspects of the subject technology can be implemented. For example, processor-based system 500 that can be any computing device making up internal computing system 110, remote computing system 150, a passenger device executing the rideshare app 170, internal computing system 110, or any component thereof in which the components of the system are in communication with each other using connection 505. Connection 505 can be a physical connection via a bus, or a direct connection into processor 510, such as in a chipset architecture. Connection 505 can also be a virtual connection, networked connection, or logical connection.

In some embodiments, computing system 500 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 500 includes at least one processing unit (CPU or processor) 510 and connection 505 that couples various system components including system memory 515, such as read-only memory (ROM) 520 and random-access memory (RAM) 525 to processor 510. Computing system 500 can include a cache of high-speed memory 512 connected directly with, in close proximity to, and/or integrated as part of processor 510.

Processor 510 can include any general-purpose processor and a hardware service or software service, such as services 532, 534, and 536 stored in storage device 530, configured to control processor 510 as well as a special-purpose processor where software instructions are incorporated into the actual processor design. Processor 510 may essentially be a completely self-contained computing system, containing multiple cores or processors, a bus, memory controller, cache, etc. A multi-core processor may be symmetric or asymmetric.

To enable user interaction, computing system 500 includes an input device 545, which can represent any number of input mechanisms, such as a microphone for speech, a touch-sensitive screen for gesture or graphical input, keyboard, mouse, motion input, speech, etc. Computing system 500 can also include output device 535, which can be one or more of a number of output mechanisms known to those of skill in the art. In some instances, multimodal systems can enable a user to provide multiple types of input/output to communicate with computing system 500. Computing system 500 can include communications interface 540, which can generally govern and manage the user input and system output. The communication interface may perform or facilitate receipt and/or transmission wired or wireless communications via wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof.

Communications interface 540 may also include one or more Global Navigation Satellite System (GNSS) receivers or transceivers that are used to determine a location of the computing system 500 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 530 can be a non-volatile and/or non-transitory computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a Blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/ReRAM), phase change memory (PCM), spin transfer torque RAM (STT-RAM), another memory chip or cartridge, and/or a combination thereof.

Storage device 530 can include software services, servers, services, etc., that when the code that defines such software is executed by the processor 510, it causes the system to perform a function. In some embodiments, a hardware service that performs a particular function can include the software component stored in a computer-readable medium in connection with the necessary hardware components, such as processor 510, connection 505, output device 535, etc., to carry out the function.

As understood by those of skill in the art, machine-learning based classification techniques can vary depending on the desired implementation. For example, machine-learning classification schemes can utilize one or more of the following, alone or in combination: hidden Markov models; recurrent neural networks; convolutional neural networks (CNNs); deep learning; Bayesian symbolic methods; general adversarial networks (GANs); support vector machines; image registration methods; applicable rule-based system. Where regression algorithms are used, they may include including but are not limited to: a Stochastic Gradient Descent Regressor, and/or a Passive Aggressive Regressor, etc.

Machine learning classification models can also be based on clustering algorithms (e.g., a Mini-batch K-means clustering algorithm), a recommendation algorithm (e.g., a Miniwise Hashing algorithm, or Euclidean Locality-Sensitive Hashing (LSH) algorithm), and/or an anomaly detection algorithm, such as a Local outlier factor. Additionally, machine-learning models can employ a dimensionality reduction approach, such as, one or more of: a Mini-batch Dictionary Learning algorithm, an Incremental Principal Component Analysis (PCA) algorithm, a Latent Dirichlet Allocation algorithm, and/or a Mini-batch K-means algorithm, etc.

Embodiments within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general purpose computer, special purpose computer, or special purpose processing device to perform a certain function or group of functions. Computer-executable instructions also include program modules that are executed by computers in standalone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules can be located in both local and remote memory storage devices.

The various embodiments described above are provided by way of illustration only and should not be construed to limit the scope of the disclosure. For example, the principles herein apply equally to optimization as well as general improvements. Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

What is claimed is:

1. A computer-implemented method comprising:
   determining a vehicle route, wherein the vehicle route comprises at least one lane plan to be followed by an autonomous vehicle (AV) in an AV fleet;
   identifying, in a map database for the AV fleet, a blockage along the vehicle route;
   determining that the blockage constitutes a persistent blockage, wherein the persistent blockage is a blockage that persists beyond a predetermined time threshold;
   associating the blockage in the map database with a predetermined persistence duration, wherein the predetermined persistence duration determines how long the persistent blockage is stored in the map database for the AV fleet, wherein the predetermined persistence duration is a predetermined amount of time that is determined based on one or more characteristics of the blockage including a classification of the blockage and a severity of the blockage associated with the vehicle route, wherein the severity is determined based on a location and a geometry of the blockage with respect to the at least one lane plan; and
   effectuating operation of the AV along an alternate vehicle route by communicating with an internal computing system of the AV, wherein the alternate vehicle route avoids the persistent blockage during the predetermined persistence duration.

2. The computer-implemented method of claim 1, wherein the predetermined persistence duration indicates an amount of time that the persistent blockage is used to inform routing decisions.

3. The computer-implemented method of claim 1, wherein determining that the blockage constitutes the persistent blockage further comprises:
   determining that the blockage is closer to at least one lane associated with the at least one lane plan than an edge of a roadway associated with the at least one lane plan.

4. The computer-implemented method of claim 1, wherein determining that the blockage constitutes the persistent blockage further comprises:
   classifying the blockage with a blockage classification based on the one or more characteristics of the blockage.

5. The computer-implemented method of claim 1, further comprising:

collecting environmental data for a map area associated with the blockage;
determining the blockage no longer exists; and
indicating a removal of the blockage based on the determination that the blockage no longer exists.

6. The computer-implemented method of claim 1, wherein determining that the blockage constitutes a persistent blockage further comprises:
incrementing a counter for tick in which the blockage is observed; and
comparing the counter to a predetermined number of ticks, wherein the blockage is confirmed to be the persistent blockage when the counter exceeds the predetermined number of ticks.

7. The computer-implemented method of claim 1, further comprising:
updating the predetermined persistence duration based on subsequent observations by other AVs in the AV fleet.

8. A system comprising:
one or more processors; and
a computer-readable medium comprising instructions stored therein, which when executed by the one or more processors, cause the one or more processors to perform operations comprising:
determining a vehicle route, wherein the vehicle route comprises at least one lane plan to be followed by an autonomous vehicle (AV) in an AV fleet;
identifying, in a map database for the AV fleet, a blockage along the vehicle route wherein the map database is accessible by a plurality of AVs in the AV fleet including the AV;
determining that the blockage constitutes a persistent blockage;
associating the blockage in the map database with a predetermined persistence duration, wherein the predetermined persistence duration determines how long the persistent blockage is stored in the map database for the AV fleet, wherein the predetermined persistence duration is a predetermined amount of time that is determined based on one or more characteristics of the blockage including a classification of the blockage and a severity of the blockage associated with the vehicle route, wherein the severity is determined based on a location and a geometry of the blockage with respect to the at least one lane plan; and
effectuating operation of the AV along an alternate vehicle route by communicating with an internal computing system of the AV, wherein the alternate vehicle route avoids the persistent blockage during the predetermined persistence duration.

9. The system of claim 8, wherein the predetermined persistence duration indicates an amount of time that the persistent blockage is used to inform routing decisions.

10. The system of claim 8, wherein determining that the blockage constitutes the persistent blockage further comprises:
determining that the blockage is closer to at least one lane associated with the at least one lane plan than an edge of a roadway associated with the at least one lane plan.

11. The system of claim 8, wherein determining that the blockage constitutes the persistent blockage further comprises:
classifying the blockage with a blockage classification based on the one or more characteristics of the blockage.

12. The system of claim 8, further comprising:
collecting environmental data for a map area associated with the blockage; determining the blockage no longer exists; and
indicating a removal of the blockage based on the determination that the blockage no longer exists.

13. A non-transitory computer-readable storage medium comprising instructions stored therein, which when executed by one or more processors, cause the one or more processors to perform operations comprising:
determining a vehicle route, wherein the vehicle route comprises at least one lane plan to be followed by an autonomous vehicle (AV) in an AV fleet;
identifying, in a map database for the AV fleet, a blockage along the vehicle route;
determining that the blockage constitutes a persistent blockage, wherein the persistent blockage is a blockage that persists beyond a predetermined time threshold;
associating the blockage in the map database with a predetermined persistence duration, wherein the predetermined persistence duration determines how long the persistent blockage is stored in the map database for the AV fleet, wherein the predetermined persistence duration is a predetermined amount of time that is determined based on one or more characteristics of the blockage including a classification of the blockage and a severity of the blockage associated with the vehicle route, wherein the severity is determined based on a location and a geometry of the blockage with respect to the at least one lane plan; and
effectuating operation of the AV along an alternate vehicle route by communicating with an internal computing system of the AV, wherein the alternate vehicle route avoids the persistent blockage during the predetermined persistence duration.

14. The non-transitory computer-readable storage medium of claim 13, wherein the predetermined persistence duration indicates an amount of time that the persistent blockage is used to inform routing decisions.

15. The non-transitory computer-readable storage medium of claim 13, wherein determining that the blockage constitutes the persistent blockage further comprises:
determining that the blockage is closer to at least one lane associated with the at least one lane plan than an edge of a roadway associated with the at least one lane plan.

16. The non-transitory computer-readable storage medium of claim 13, wherein determining that the blockage constitutes the persistent blockage further comprises:
classifying the blockage with a blockage classification based on the one or more characteristics of the blockage.

* * * * *